United States Patent
Newton et al.

(10) Patent No.: US 9,591,047 B1
(45) Date of Patent: Mar. 7, 2017

(54) INVALIDATION IN A CONTENT DELIVERY NETWORK (CDN)

(71) Applicant: Level 3 Communications, LLC, Broomfield, CO (US)

(72) Inventors: Christopher Newton, Westlake Village, CA (US); Fiona Wong, Thousand Oaks, CA (US); Laurence Lipstone, Calabasas, CA (US); William Crowder, Camarillo, CA (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 15/095,282

(22) Filed: Apr. 11, 2016

(51) Int. Cl.
 *G06F 15/16* (2006.01)
 *H04L 29/06* (2006.01)
 *H04L 29/08* (2006.01)

(52) U.S. Cl.
 CPC ........ *H04L 65/602* (2013.01); *H04L 67/1023* (2013.01)

(58) Field of Classification Search
 CPC H04L 41/509; H04L 67/2852; H04L 67/2842
 USPC ........ 709/202, 216, 223, 224, 219; 711/113, 711/118
 See application file for complete search history.

(56) References Cited

U.S. PATENT DOCUMENTS

| | | | |
|---|---|---|---|
| 5,434,994 A * | 7/1995 | Shaheen | G06F 12/0815 707/999.202 |
| 6,571,261 B1 | 5/2003 | Wang-Knop et al. | |
| 6,757,708 B1 | 6/2004 | Craig et al. | |
| 6,981,105 B2 * | 12/2005 | Bourne | G06F 12/0891 711/144 |
| 7,076,608 B2 | 7/2006 | Arunagirinathan et al. | |
| 7,395,346 B2 | 7/2008 | Pinder et al. | |
| 7,461,206 B2 | 12/2008 | Bhanoo et al. | |
| 7,840,667 B2 | 11/2010 | Weller et al. | |
| 7,860,964 B2 | 12/2010 | Stolorz et al. | |
| 8,060,613 B2 | 11/2011 | Farber | |
| 8,255,557 B2 | 8/2012 | Raciborski et al. | |
| 8,275,816 B1 | 9/2012 | Pegg | |
| 8,412,823 B1 * | 4/2013 | Richardson | H04L 47/70 709/225 |
| 8,543,702 B1 | 9/2013 | Marshall et al. | |
| 8,577,827 B1 | 11/2013 | Sehn et al. | |
| 8,626,876 B1 | 1/2014 | Kokal et al. | |
| 8,645,517 B2 | 2/2014 | Stolorz et al. | |
| 8,788,671 B2 | 7/2014 | Richardson et al. | |
| 8,819,283 B2 | 8/2014 | Richardson et al. | |
| 8,825,830 B2 | 9/2014 | Newton | |

(Continued)

OTHER PUBLICATIONS

Golaszewski, S. , "Content Distribution Networks", *Communication Systems V* Ch. 3, pp. 37-52 Aug. 2012 , 89 pgs.

*Primary Examiner* — Frantz Jean

(57) ABSTRACT

A content delivery (CD) service in a CDN maintains property invalidation information on said CD service including, for each property, a list of one or more group invalidation commands. New group invalidation commands are added by selectively merging one or more invalidation commands to form a merged invalidation command and inserting the merged invalidation command into said list, wherein the merging is based on a length of common prefix of elements in said list. A per property common prefix list is maintained for invalidation commands in each property list.

16 Claims, 6 Drawing Sheets

(56) References Cited

U.S. PATENT DOCUMENTS

| | | |
|---|---|---|
| 8,949,533 B2 | 2/2015 | Puthalath et al. |
| 2002/0116583 A1 | 8/2002 | Copeland et al. |
| 2002/0120717 A1 | 8/2002 | Giotta |
| 2003/0200283 A1 | 10/2003 | Suryanarayana et al. |
| 2004/0068622 A1* | 4/2004 | Van Doren ........... G06F 12/084 711/146 |
| 2004/0136327 A1 | 7/2004 | Sitaraman |
| 2004/0193656 A1* | 9/2004 | Pizzo ................ G06F 17/30902 |
| 2005/0010653 A1 | 1/2005 | McCanne |
| 2005/0086386 A1 | 4/2005 | Shen et al. |
| 2005/0289388 A1 | 12/2005 | Black-Ziegelbein et al. |
| 2006/0212524 A1 | 9/2006 | Wu et al. |
| 2007/0156876 A1* | 7/2007 | Sundarrajan ........ H04L 67/2852 709/223 |
| 2007/0156965 A1 | 7/2007 | Sundarrajan et al. |
| 2007/0156966 A1 | 7/2007 | Sundarrajan et al. |
| 2007/0162434 A1 | 7/2007 | Alessi et al. |
| 2007/0198678 A1 | 8/2007 | Dieberger et al. |
| 2007/0271385 A1 | 11/2007 | Davis et al. |
| 2008/0256299 A1 | 10/2008 | Iyengar et al. |
| 2008/0281915 A1 | 11/2008 | Elad |
| 2008/0313267 A1 | 12/2008 | Desai et al. |
| 2009/0019228 A1 | 1/2009 | Brown et al. |
| 2009/0165115 A1 | 6/2009 | Toumura et al. |
| 2009/0254661 A1 | 10/2009 | Fullagar et al. |
| 2010/0042734 A1 | 2/2010 | Olafsson et al. |
| 2010/0169786 A1 | 7/2010 | O'Brien |
| 2010/0180105 A1 | 7/2010 | Asnaashari |
| 2010/0228962 A1 | 9/2010 | Simon et al. |
| 2011/0007745 A1 | 1/2011 | Schultz |
| 2011/0022812 A1 | 1/2011 | van der Linden et al. |
| 2011/0107364 A1 | 5/2011 | Lajoie et al. |
| 2011/0153724 A1 | 6/2011 | Raja et al. |
| 2011/0238488 A1 | 9/2011 | Hahn et al. |
| 2012/0150993 A1 | 6/2012 | Flack et al. |
| 2012/0198043 A1 | 8/2012 | Hesketh et al. |
| 2012/0221767 A1* | 8/2012 | Post .................... G06F 13/1673 711/103 |
| 2012/0284384 A1 | 11/2012 | Shi et al. |
| 2012/0290911 A1 | 11/2012 | Zhao |
| 2014/0095537 A1 | 4/2014 | Park et al. |
| 2014/0122725 A1 | 5/2014 | Batrouni et al. |
| 2014/0172944 A1 | 6/2014 | Newton et al. |
| 2014/0172951 A1 | 6/2014 | Varney et al. |
| 2014/0172956 A1 | 6/2014 | Varney et al. |
| 2014/0173038 A1 | 6/2014 | Newton et al. |
| 2014/0173041 A1 | 6/2014 | Newton et al. |
| 2014/0173045 A1 | 6/2014 | Crowder et al. |
| 2014/0173046 A1 | 6/2014 | Crowder et al. |
| 2014/0173047 A1 | 6/2014 | Crowder et al. |
| 2014/0173048 A1 | 6/2014 | Crowder et al. |
| 2014/0173062 A1 | 6/2014 | Lipstone et al. |
| 2014/0173064 A1 | 6/2014 | Newton et al. |
| 2014/0173077 A1 | 6/2014 | Newton et al. |
| 2014/0173087 A1 | 6/2014 | Varney et al. |
| 2014/0173097 A1 | 6/2014 | Newton et al. |
| 2014/0198641 A1 | 7/2014 | Perkuhn et al. |
| 2014/0222977 A1 | 8/2014 | Varney et al. |
| 2014/0223003 A1 | 8/2014 | Varney et al. |
| 2014/0223015 A1 | 8/2014 | Varney et al. |
| 2014/0344413 A1 | 11/2014 | Lipstone et al. |
| 2014/0344452 A1 | 11/2014 | Lipstone et al. |

* cited by examiner

INVALIDATION IN A CONTENT DELIVERY NETWORK (CDN)

BACKGROUND OF THE INVENTION

Copyright Statement

This patent document contains material subject to copyright protection. The copyright owner has no objection to the reproduction of this patent document or any related materials in the files of the United States Patent and Trademark Office, but otherwise reserves all copyrights whatsoever.

INCORPORATION BY REFERENCE

The following U.S. Patents are hereby fully incorporated herein by reference for all purposes:
1. U.S. Pat. No. 8,060,613 titled "Resource invalidation in a content delivery network," filed Oct. 31, 2007, issued Nov. 15, 2011.
2. U.S. Pat. No. 8,825,830, titled "Content Delivery Framework With Dynamic Service Network Topology," filed Mar. 15, 2013, issued Sep. 2, 2014.

FIELD OF THE INVENTION

This invention relates to content delivery and content delivery networks. More specifically, this invention relates to invalidation in content delivery networks.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Glossary

As used herein, unless used otherwise, the following terms or abbreviations have the following meanings:
CDN means content delivery network;
HTTP means Hyper Text Transfer Protocol;
HTTPS means HTTP Secure;
MOV means minimum origin version;
ROV means resource origin version;
URI means Uniform Resource Identifier; and
URL means Uniform Resource Locator.

A "mechanism" refers to any device(s), process(es), routine(s), service(s), module(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered shorthand for the term device(s) and/or process(es) and/or service(s).

Background and Overview

A content delivery network (CDN) distributes content (e.g., resources) efficiently to clients on behalf of one or more content providers, preferably via a public Internet. Content providers provide their content (e.g., resources) via origin sources (origin servers or origins). A CDN can also provide an over-the-top transport mechanism for efficiently sending content in the reverse direction—from a client to an origin server. Both end-users (clients) and content providers benefit from using a CDN. Using a CDN, a content provider is able to take pressure off (and thereby reduce the load on) its own servers (e.g., its origin servers). Clients benefit by being able to obtain content with fewer delays.

Figure 1:
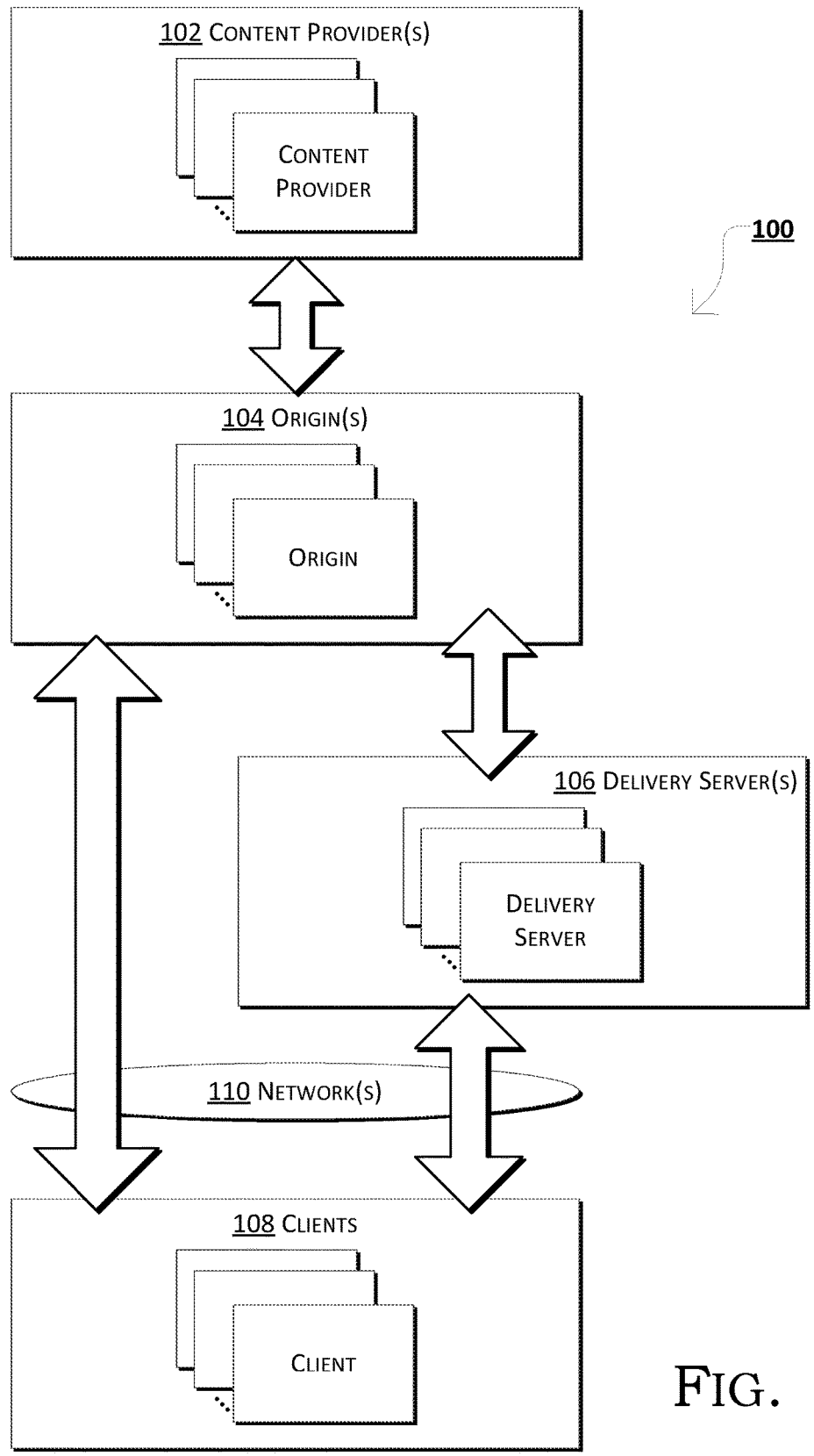
FIG. 1 depicts aspects of a content delivery network (CDN) according to exemplary embodiments hereof.

FIG. 1 shows aspects of an exemplary CDN 100 in which one or more content providers 102 provide content via one or more origin sources 104 and delivery services (servers) 106 to clients 108 via one or more networks 110. The delivery services (servers) 106 may form a delivery network from which clients may obtain content. The delivery services 106 may be logically and/or physically organized hierarchically and may include edge caches.

Exemplary CDNs are described in U.S. Pat. Nos. 8,060,613 and 8,825,830, the entire contents of both of which have been fully incorporated herein by reference for all purposes.

Content associated with or provided by a particular content provider may be referred to as a property. A property may be, e.g., a website and related content, and typically comprises multiple resources. A CDN may provide one or more properties associated with and/or on behalf of one or more content providers. A content provider may have more than one property, and thus a CDN may serve/provide one or more properties associated with and/or on behalf of a particular content provider.

As should be appreciated, components of a CDN (e.g., delivery servers or the like) may use the CDN to deliver content to other CDN components. Thus a CDN component may itself be a client of the CDN. For example, the CDN may use its own infrastructure to deliver CDN content (e.g., CDN control and configuration information) to CDN components.

Content (e.g., resources associated with a property of a content provider) may be cached at various locations within the CDN, e.g., at nodes in a delivery network formed by the various delivery services of the CDN. Content may be cached, e.g., when it is served from the CDN.

A CDN should not serve stale or expired or invalidated (invalid) content, and invalid or expired or stale content should be refreshed before being served (if a valid version of the content exists). Content may be refreshed asynchronously.

Invalidation is a mechanism through which information stored in a service (e.g., information that may be used to derive responses to future requests) is marked or designated as no longer directly usable for response derivation, thus indicating that some form of state update or alternate derivation path must be used to derive a response to a future request. Services making use of invalidation consume invalidation manifests and locally process the commands contained in these manifests.

A caching or delivery service is the typical example of a service that makes use of invalidation. A cache stores literal copies of resources and responds to future requests for the resource (or information based on the resource) using the stored literal copy as long as the copy is not stale. As should be appreciated, a request may be for a particular resource itself or for information (e.g., another resource) that is determined or derived based on the particular resource. Staleness in this case could be based, e.g., on an age-based expiration of the original copy that was stored, or on whether or not the copy has explicitly been invalidated since the copy was stored. When an invalidation command is received with the target of the command already in cache, it suffices to mark the cached copy to implement the command. When the resource is not in cache, or when the command refers to a group of potentially many resources, additional steps must be taken to ensure that a copy retrieved later (e.g., from some other cache) satisfies the constraints of the last applicable invalidation command. The term "invalidation" is sometimes used herein to refer to an invalidation command.

Cached content may be associated with a time-to-live (TTL) value, in which case the content should not be served (i.e., should not be considered valid) after its TTL has expired. Content may also be invalidated by signaling its invalidation to the delivery services (or to the delivery services network). Invalidation may be signaled, e.g., by providing an invalidation instruction specifying one or more resources.

For the purposes of this description, a resource is or corresponds to an addressable item of content. Each resource provided (e.g., served) by a CDN, including internal CDN resources, may be identified or addressed by a uniform resource identifier (URI) which may be a uniform resource locator (URL). URIs are described, e.g., in Network Working Group, Request for Comments (RFC) 3986, Berners-Lee, January 2005, "Uniform Resource Identifier (URI): Generic Syntax," and URLs are described, e.g., in Network Working Group, Berners-Lee, Request for Comments 1738, December 1994, "Uniform Resource Locators (URL)," the entire contents of both of which are hereby fully incorporated herein by reference for all purposes.

In preferred embodiments, each resource is addressable by a URL, and an invalidation instruction may specify a single resource or a group of (zero or more) resources. An invalidation instruction that specifies a single resource may specify a URL (or URI) for that resource. A resource group may be specified, e.g., by a set of constraints on the set of possible resources. Thus, in general, a group invalidation specifies a group by one or more constraints that define members of the group.

A group invalidation instruction may, e.g., specify that all the content in a certain subdirectory or all resources with a common extension are no longer valid. An invalidation instruction that specifies a group of resources may, e.g., use one or more wildcards in the specification of those resources. In some implementations, group invalidations are referred to as wildcard invalidations.

For example, a particular content provider (CP) may have a property specified by the root "/CP" and may include images under the sub-directory "/CP/Images". A particular image (e.g., "/CP/Images/Image1.jpg") can be invalidated, as can a group of images (e.g., "/CP/Images/Image_September*2014.jpg"), where the star symbol is a metacharacter (or wildcard) that corresponds to zero or more characters. It should be appreciated that a group invalidation may specify zero or more resources. For example, there may not be any resources that satisfy the constraint "/CP/Images/Image_September*2014.jpg".

As used here, "resource" means a (potentially) cached response to a particular request, so theoretically any attributes of the request or the response may be considered to define a group. An actual implementation of a resource group based invalidation system might impose additional constraints on how groups can be defined for efficiency, but such constraints need not be imposed at the architectural level.

In some preferred implementations hereof, a group may be specified by a pattern language such as a so-called "glob" pattern language. As used herein, a glob pattern language is any pattern language where the "*" metacharacter is used to match any sequence of characters, although other metacharacters may also exist. A glob is a pattern written in a glob pattern language. A *-glob (star glob) pattern language is a glob pattern language with only the "*" metacharacter and literal characters. A *-glob (star-glob) (or *-glob pattern) is a pattern written in a *-glob pattern language. It should be appreciated that the system is not limited in any way by the pattern matching algorithms or languages used or described herein. Nor is the system in any way limited by the particular language or program used to implement the patterns or pattern matching (or related operations) described herein. In particular, it should be appreciated that regular expressions or glob patterns defined on a URL are just some of many possible ways to define groups. Those of skill in the art will realize and understand, upon reading this description, that different and/or other ways of describing groups may be used and are contemplated herein.

Minimum Origin Version (MOV) Invalidation

Invalidation manifests implement an approach to invalidation based on origin versions. When content is invalidated via an invalidation command, a minimum origin version (mov) for that invalidated content is incremented. Minimum origin version invalidation assumes each origin is a single resource namespace, and that all invalidation commands are relative to some origin threshold event at a single origin location. This approach allows invalidation to be defined as the setting of a minimum origin version, where each cache in the system estimates the minimum origin version as content enters from origins. MOV invalidations generally require that the origin server(s) be consistent when publishing content at multiple locations, so that a given URL will receive a consistent resource regardless of which origin is contacted.

Each resource in a cache has a resource origin version (ROV) associated therewith. The ROV for resource(s) is obtained/set when the cache obtains content directly from an origin server or from another cache. The ROV remains as the actual origin version of that copy of the resource wherever it goes until it is revalidated or refreshed. If a cache requests content from another cache, the client cache uses whatever ROV the server provides as the ROV it stores in cache.

Each invalidation command (IC) has an associated MOV value. If the ROV value for a resource in a cache is at least as great as the MOV value, then the resource is considered valid and can be served. On the other hand, if the ROV value is less than the MOV value for a cached resource, then a new version of the resource must be obtained before being served. For example, if an invalidation command implicating a particular resource R has an mov=100, and the cached version of resource R has an rov=99, then the resource R is considered stale and cannot be served. On the other hand, if the cached version of resource R has an rov=100 or higher then the cached version of resource R is not stale and can be used (e.g., served).

MOV invalidations are described in U.S. Pat. No. 8,825,830, titled "Content Delivery Framework With Dynamic Service Network Topology," filed Mar. 15, 2013, issued Sep. 2, 2014, the entire contents of which hereby fully incorporated herein by reference for all purposes, including specifically for the description of invalidation and MOV invalidations.

Figure 2:
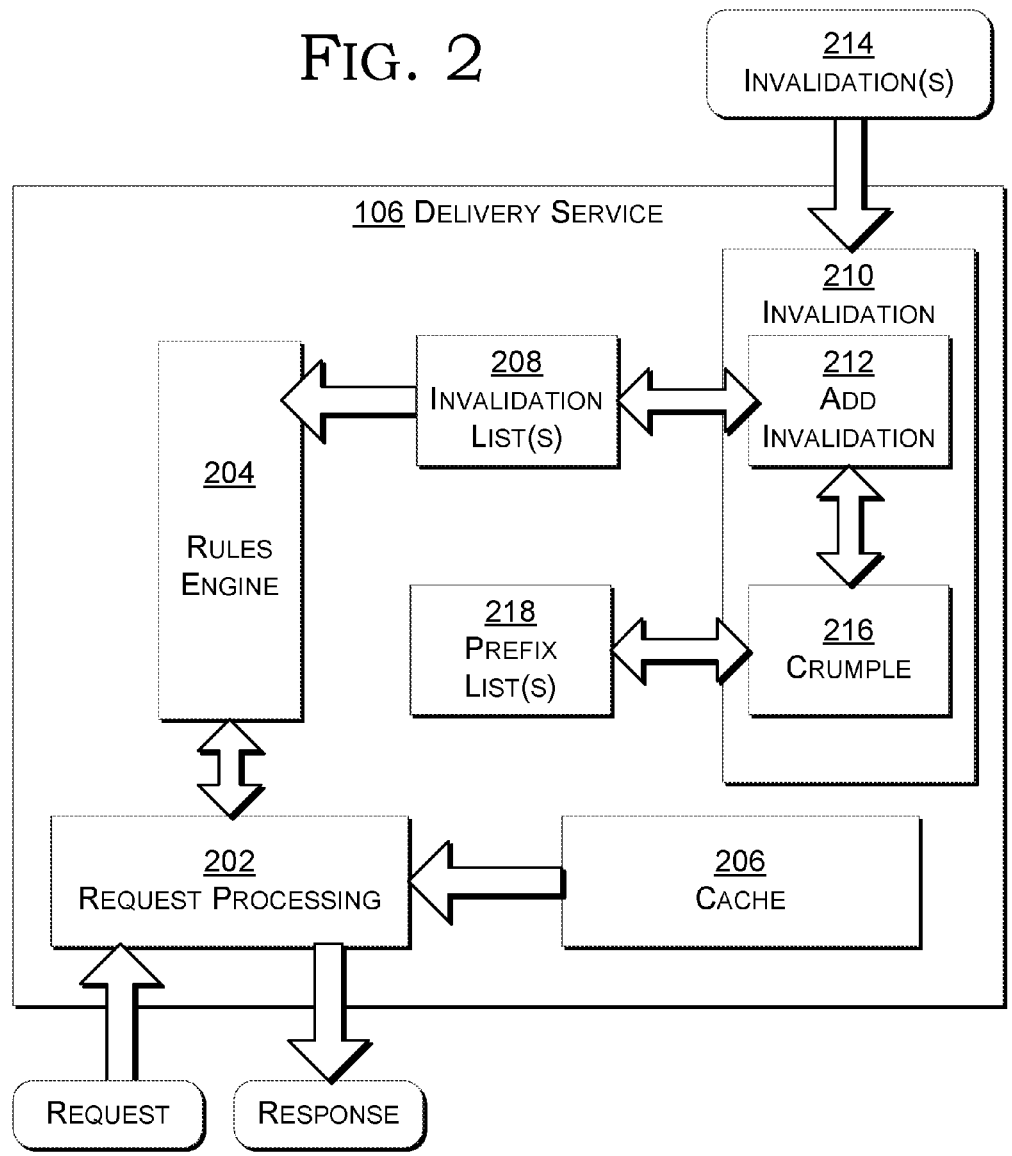
FIG. 2 depicts a logical structure of a delivery service according to exemplary embodiments hereof.

FIG. 2 depicts a logical structure of a delivery service 106 according to exemplary embodiments hereof. As shown in FIG. 2, a delivery service 106 includes request/response-processing mechanism 202, that interacts with a rules engine 204, to process and to provide responses to incoming requests. A requested resource may already be cached in a local cache 206 associated with the delivery service 106, although, as explained, it is necessary to determine the validity of any cached resource before serving it. In this regard, the rules engine 204 may access one or more invalidation lists 208 that are maintained at the delivery service 106 by an invalidation mechanism 210.

For the purposes of this description the role of the invalidation mechanism 210 is to maintain the invalidation information (e.g., invalidation lists 208) on the delivery service 106, as described in greater detail below.

Figure 3:
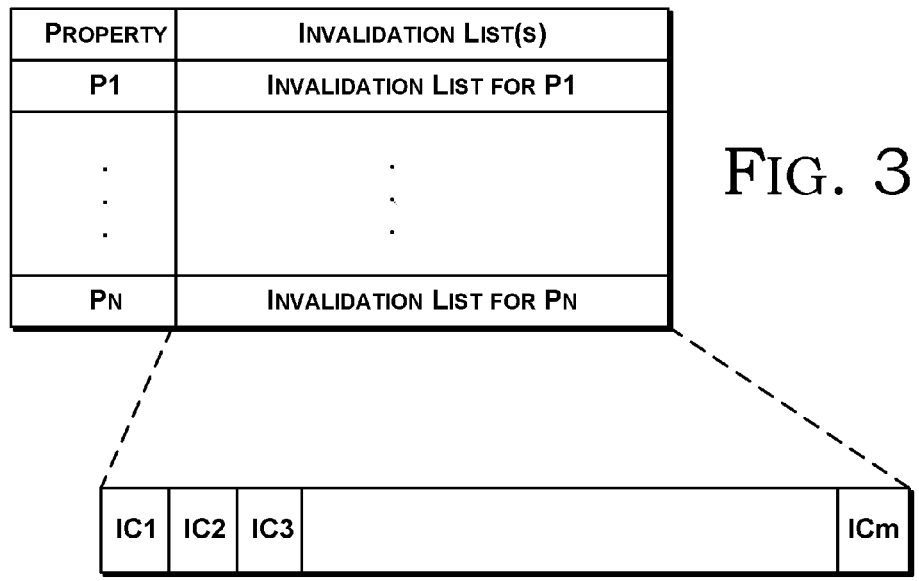
FIG. 3 shows an example data structure for storing invalidation lists according to exemplary embodiments hereof.

Preferably each delivery service 106 is responsible for serving a particular property or set of properties, and preferably there is an invalidation list for each property for which a delivery service 106 is responsible. FIG. 3 shows an example data structure for storing n invalidation lists, one list for each of the properties $P_1, P_2 \ldots P_n$ that the delivery service 106 may serve (assume, in this case, that the delivery service is responsible for serving each of the n properties). An exemplary invalidation list for a particular property may include a number of invalidation commands (or constraints) for that property. For example, as shown in FIG. 3, an invalidation list for property $P_n$ may include up to m invalidation commands ($IC_1, IC_2, IC_3 \ldots IC_m$) for that property. It should be appreciated that one aspect of this approach is that invalidation commands that are received at a cache, and which do not hit resources in that cache (or for properties that could be served from that cache) may need to be kept to ensure that any subsequent fill of a matching resource is done in a coherent manner.

An invalidation command ($IC_j$) specifies a mov and some resource descriptor or specifier that identifies a single resource or group of resources that may or may not currently be in cache. An IC that specifies exactly one resource (e.g., by name) may also be referred to as a ground resource specifier. Ground ICs may be processed upon receipt, marking the specified resource as invalid when the IC is received. Group invalidations (invalidation commands that specify groups) are evaluated when requests are received. Thus an invalidation command I may be (i) a ground command of the form I(mov, R), where R specifies exactly one resource and mov is a MOV value for that resource; or (ii) a group command of the form I(mov, G) where mov is a MOV value and G specifies a constraint set. While a ground resource specifier specifies one resource, in some cases, a ground invalidation command may impact multiple resources, all of which may be accessed by a single URL (e.g., resources with multiple content encodings available, or multiple variants).

Figure 4:
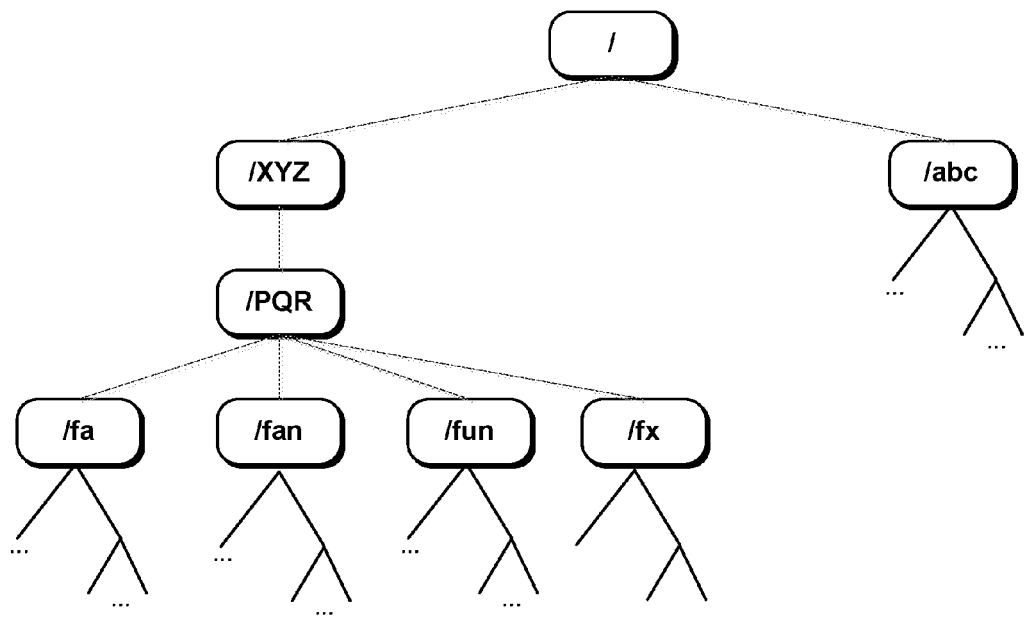
FIG. 4 shows the hierarchical or tree structure of an example property for a particular content provider.

FIG. 4 shows the hierarchical or tree structure of an example property for a particular content provider. For the sake of this example, the property begins with a slash "/" character and has two main subtrees of resources ("/XYZ" and "/abc"). The sub-tree of resources specified by "/XYZ" includes a subtree of resources "/XYZ/PQR" which includes four sub-trees of resources ("/XYZ/PQR/fa/", "/XYZ/PQR/fan", "/XYZ/PQR/fun/" and "/XYZ/PQR/fx"). The property may include other subtrees (not shown).

The following is an example invalidation list for a property configured to have a maximum of ten invalidation commands (ICs), with seven commands stored and having space for three more invalidation commands. Note that the list is MOV ordered, based on the MOV values provided with the invalidation commands or manifests, or on MOV values determined during crumpling (as described below).

|    | Invalidation Pattern/Constraint | MOV Value |
|----|----------------------------------|-----------|
| 1  | /XYZ/PQR/f*                      | 100       |
| 2  | /XYZ/PQR/fu*                     | 110       |
| 3  | /abc/def/2*                      | 112       |
| 4  | /elect/2015*                     | 120       |
| 5  | /diet/atk*                       | 130       |
| 6  | /abc/def/4*                      | 140       |
| 7  | /XYZ/PQR/ab*                     | 200       |
| 8  |                                  |           |
| 9  |                                  |           |
| 10 |                                  |           |

In this example list the invalidation commands/constraints are specified in the form of glob-* patterns. Thus, e.g., the first pattern will match any resource that begins with the string "/XYZ/PQR/f", whereas the second pattern will match any resource that begins with the string "/XYZ/PQR/fu." Thus, with reference to the property hierarchy shown in FIG. 4, the first pattern/constraint ("/XYZ/PQR/f*") matches the four subtrees of resources "/XYZ/PQR/fa/", "/XYZ/PQR/fan", "/XYZ/PQR/fun/", and "/XYZ/PQR/fx", whereas the second constraint ("/XYZ/PQR/fu*") only matches the subtree "/XYZ/PQR/fun".

An invalidation command/constraint may implicate valid resources. For example, in the example shown in FIG. 4, assume that some resources in the sub-tree "/XYZ/PQR/fun" are invalid, but that all resources in the other subtrees ("/XYZ/PQR/fa/", "/XYZ/PQR/fan", and "/XYZ/PQR/fx") are still valid. The invalidation command #1 ("/XYZ/PQR/f*") will implicate all of the resources in the subtrees ("/XYZ/PQR/fa/", "/XYZ/PQR/fan", and "/XYZ/PQR/fx"), even though they are valid. On the other hand, the invalidation command #2 will not implicate those valid resources.

It is generally preferable for an invalidation constraint to implicate (and thus invalidate) as few (if any) valid resources as possible. In other words, it is generally preferable for an invalidation constraint to have the least impact on valid resources while still invalidating all invalid resources.

The invalidation mechanism 210 includes an add invalidation mechanism 212 that is used to add invalidation commands to the appropriate invalidation list(s) 208. When the delivery service 106 receives new invalidation command(s) 214 (e.g., in the form of an invalidation manifest), the add invalidation mechanism 212 tries to add at least some of those commands to appropriate invalidation lists 208, as described below.

As noted, each property's invalidation list has a maximum size (max) (i.e., a maximum number of constraints that it may store). This maximum is preferably set by an administrator and is preferably not settable by users (i.e., by the CDN's subscribers). Each invalidation list may also have a threshold value (T) associated therewith (where T<max). In a presently preferred implementation the maximum global default number of patterns to store and search per property is 100. The motivation for this initial default is to limit the number of glob searches per request (during request/response processing). It should be appreciated that different subscribers may have different maximum list sizes.

Figure 5:
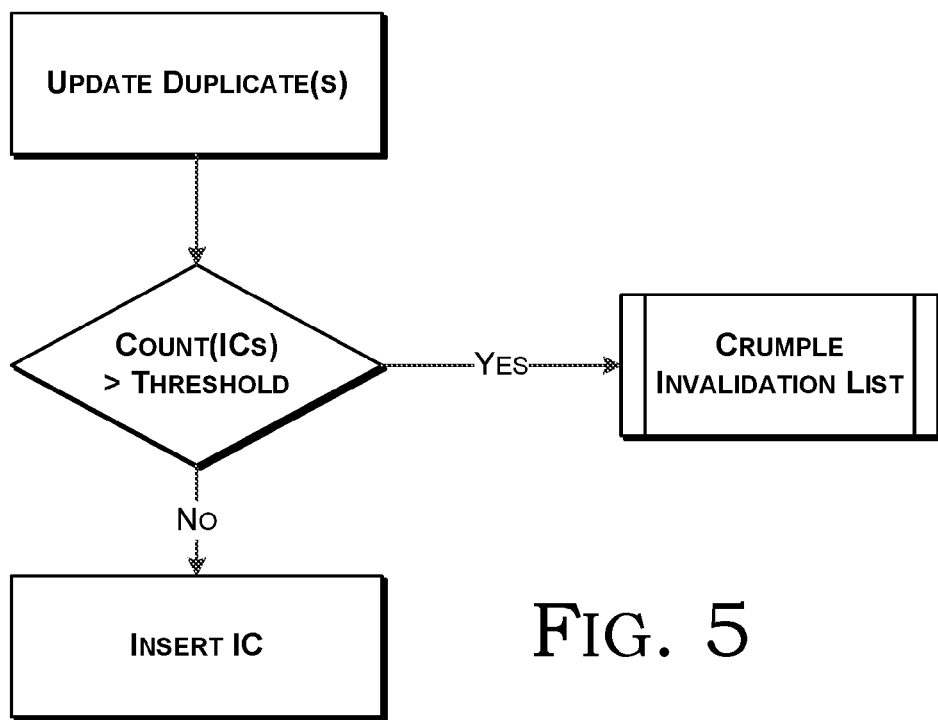
FIG. 5 is a flow chart of operation of aspects hereof.

With reference to the flow chart in FIG. 5, when the delivery service 106 receives new invalidation command(s) 214, the add invalidation mechanism 212 checks the new commands 214 against the appropriate invalidation list 208 for duplicates. Exact duplicates of existing patterns are deleted and updated with the new (latest) MOV value as well as the Force MOV value (the MOV tracked if an invalidation is of type force, discussed below). In operation, an invalid resource typically remains in the cache until a request for that resource triggers a revalidation of the resource (e.g., via an origin server or a peer). The revalidation take the form of a conditional GET that gets the resource only if its been modified. A so-called "forced" invalidation performs an unconditional "GET" of the resource from the origin server (or an appropriate location).

Upon insertion, if the number of patterns exceeds the allowed number (or the threshold for that property), crumpling is initiated until the number of patterns falls below the maximum allowed number (or the threshold).

Crumpling

For a pattern-based (non-explicit) invalidation approach, invalidations can never safely expire. To try and mitigate the potential performance impacts of this approach, crumpling is optimized. The goal is to crumple two entries such that the result of crumpling produces the least impact.

Crumpling, in the context of an invalidation list, is performed by a crumple mechanism 216. Crumpling is the effect of merging or somehow combining two or more invalidation patterns or constraints. Crumpling may be defined in terms of a crumple function that takes as input two or more invalidation commands (including their associated MOV values) and returns an invalidation command (the merged command) that is at least as strict as the input invalidation commands. In other words, the merged command should invalidate at least every resource that the input commands would invalidate.

The combined/merged constraint is inserted into the invalidation list and replaces all of the constraints that were combined/merged and the resulting invalidation constraint should be at least as strict as all combined constraint.

Note that the inputs to the crumple function may be from the current invalidation list only or they may include one or more of the newly received invalidation commands.

For crumpling to have the minimum effective impact there are two basic assumptions:
1. Crumpling a directory, especially affects a larger number of resources than crumpling within a directory.
2. Crumpling a larger number of characters within a directory affects a larger number of resources than crumpling a smaller number of characters.

In preferred implementations there is no index or list of the resources in cache, and there is also generally no way to know how many actual resources are in a sub-directory. Those of ordinary skill in the art will realize and appreciate, upon reading this description, that since there is no way to know how many actual resources are in any sub-directory, these assumptions may not always give an optimal result.

Figure 6:
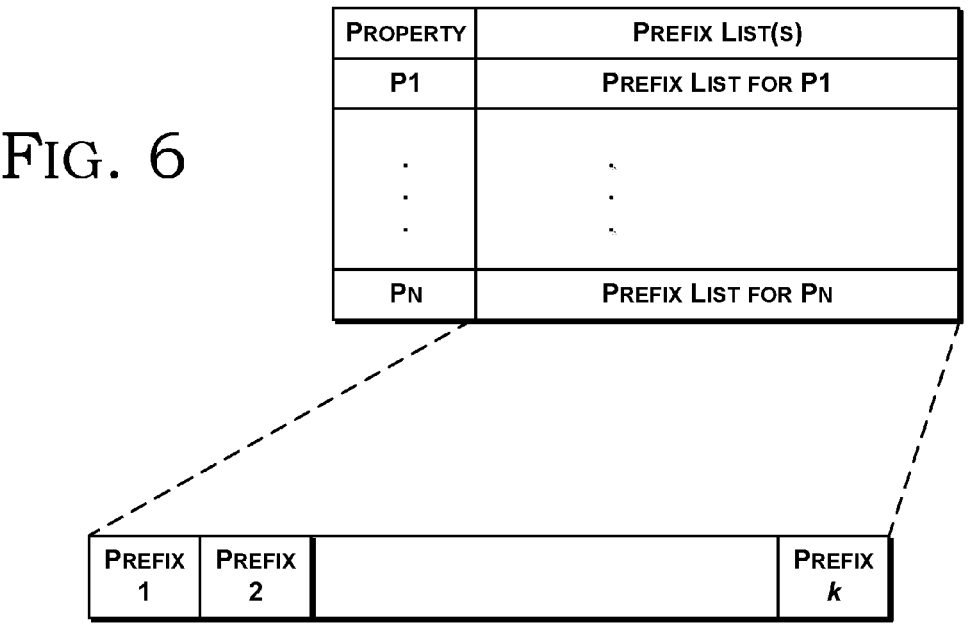
FIG. 6 shows an example data structure for storing common prefix lists according to exemplary embodiments hereof.

The crumple mechanism 216 maintains a prefix list (or common prefix array) 218 for each property for which the service 106 is responsible. That is, the crumple mechanism 216 maintains a common prefix array per property for each property for which there is an invalidation list 208 (FIGS. 2 and 6). When a new invalidation pattern is received, the new pattern is checked against the existing list of patterns. If a common prefix is found, then the common prefix is added to the prefix array (if it is not already there). The prefix array is sorted from "smallest impact" to "largest impact" (based on the two assumptions given above). The prefix array can be no larger than the maximum number of allowed patterns. Crumpling can also occur within the prefix array but should occur infrequently, and if so, elements are deleted from largest impact to smallest impact order.

Crumpling then involves taking the smallest impact prefix array element and matching and combining invalidation patterns for that common prefix.

The following is an example MOV-ordered invalidation list for a property configured to have a maximum of ten invalidation commands, with ten commands stored and having space for no more invalidation commands (ICs). Exemplary MOV values are shown in these examples.

|   | Invalidation Pattern/Constraint | MOV Value |
|---|---|---|
| 1 | /XYZ/PQR/f* | 100 |
| 2 | /XYZ/PQR/fu* | 110 |
| 3 | /abc/def/2* | 112 |
| 4 | /elect/2015* | 120 |
| 5 | /diet/atk* | 130 |
| 6 | /abc/def/4* | 140 |
| 7 | /elect/2012* | 150 |
| 8 | /XYZ/PQR/ab* | 200 |
| 9 | /diet/nocrb* | 220 |
| 10 | /st/patrick/* | 230 |

The corresponding prefix list for this property is:

|   | Common Prefix list |
|---|---|
| 1 | /diet/ |
| 2 | /abc/def/ |
| 3 | /XYZ/PQR/ |
| 4 | /elect/201 |
| 5 | /XYZ/PQR/f |
| 6 |  |
| 7 |  |
| 8 |  |
| 9 |  |
| 10 |  |

In this example, when a new invalidation command (e.g., "/st/peter/*") is received, an entry ("/st/p") should be added to the prefix list of (the longest common prefix between it and any entries already in the invalidation table) prior to determining which to crumple. Since this crumples 6 characters within the directory, it should be inserted immediately before "/elect/201", as shown below:

|   | Common Prefix list |
|---|---|
| 1 | /diet/ |
| 2 | /abc/def/ |
| 3 | /XYZ/PQR/ |

-continued

| | Common Prefix list |
|---|---|
| 4 | /st/p |
| 5 | /elect/201 |
| 6 | /XYZ/PQR/f |
| 7 | |
| 8 | |
| 9 | |
| 10 | |

It is also necessary to make room on the invalidation list. There are a number of possible merge candidates, e.g.:

(i) "/XYZ/PQR/f*" and "/XYZ/PQR/fu*" may be merged to "/XYZ/PQR/f*"; or (ii) "/diet/atk*" and "/diet/nocrb*" may be merged to "/diet/*"; or (iii) "/XYZ/PQR/f*" and "/XYZ/PQR/fu*" and "/XYZ/PQR/ab*" may be merged to "/XYZ/PQR/*"; or (iv) "/abc/def/2*" and "/abc/def/4*" may be merged to "/abc/def/*"; or (v) "/XYZ/PQR/f*" and "/XYZ/PQR/fu*" and "/XYZ/PQR/ab*" and "/diet/atk*" and "/diet/nocrb*" may all be merged to "/di*"; or (vi) "/elect/2015*" and "/elect/2012*" may be merged into "/elect/201*"; or (vii) "/st/peter/*" and "/st/patrick/*" may be merged into "/st/p*"; or (vii) all of the patterns/constraint may be merged into "/*".

Clearly the last one, (vii) will implicate the most resources, as it effectively forces invalidation of every resource for the property.

However, based on the prefix array, the merger of ICs to the prefix "/XYZ/PQR/f*" should have the smallest impact (on valid resources). Accordingly, the two patterns "/XYZ/PQR/f*" and "/XYZ/PQR/fu*" are merged to "/XYZ/PQR/f*" and the new pattern is inserted into the list.

The result of the crumpling is shown below:

| | Invalidation Pattern/Constraint | MOV Value |
|---|---|---|
| 1 | /XYZ/PQR/f* | 110 |
| 2 | /abc/def/2* | 112 |
| 3 | /elect/2015* | 120 |
| 4 | /diet/atk* | 130 |
| 5 | /abc/def/4* | 140 |
| 6 | /elect/2012* | 150 |
| 7 | /XYZ/PQR/ab* | 200 |
| 8 | /diet/nocrb* | 220 |
| 9 | /st/patrick/* | 230 |
| 10 | /st/peter/* | 235 |

As noted, the invalidation lists are MOV-ordered. The MOV value is updated during the crumpling. In particular, the MOV value of the merged pattern is the highest MOV value of the patterns being merged. Thus, e.g., when combining "/XYZ/PQR/f*" and "/XYZ/PQR/fu*" the resulting entry would have the highest MOV of the combined invalidation commands; in this case the MOV from the "/XYZ/PQR/fu*" command. The MOV value of "/XYZ/PQR/f*" was 100 and that of "/XYZ/PQR/fu*" was 110, therefore the MOV value of the merged pattern is 110=max (100, 110). In general, if k invalidation patterns (P1 . . . . Pk) are being merged (or crumpled) into pattern Pc, then the MOV of Pc is max(mov$_i$, i=1 . . . k). Note that a particular pattern being merged may already be the result of a previous merger, and so the MOV of that particular pattern may have been set during that merger. Note too that the pattern Pc may be one of the already present patterns (Pi) that are being merged, however its MOV value may change. For instance, in the example, given, the pattern "/XYZ/PQR/f*" was in the list before and after the crumple, but its MOV value changed (from 100 to 110).

In the above example, the values for "/abc/def/2*" and beyond stay as they were in the initial table.

Those of ordinary skill in the art will realize and appreciate, upon reading this description, that updating the MOV value of a merged resource may result in more false positive invalidations.

In the example given here, resources that had a request path of /XYZ/PQR/fABC and that were stored with an ROV of 100 or greater would have been considered fresh with the original invalidation constraint list. However, post-crumpling, only such resources with an ROV of 110 or greater would be considered valid.

Based on the merger and insert, the common prefix list is updated as follows:

| | Common Prefix list |
|---|---|
| 1 | /diet/ |
| 2 | /abc/def/ |
| 3 | /XYZ/PQR/ |
| 4 | /st/p |
| 5 | /elect/201 |
| 6 | |
| 7 | |
| 8 | |
| 9 | |
| 10 | |

As is apparent from this example, the crumpled invalidation commands do not have to include the new commands, and commands already in the list may be the one(s) that are merged.

The decision as to which invalidation commands to crumple or merge may be based on the MOV value of the combined commands. In some cases, invalidation commands may be merged based on which have the lowest change in MOV value in the combined commands. In some cases, invalidation commands may be merged based on which have the lowest actual MOV value in the combined commands. The MOV value may be used, e.g., as a tie-breaker for merge/crumple candidates.

As an example, consider the four invalidation commands:
IC1: constraint1, mov1
IC2: constraint2, mov2
IC3: constraint3, mov3
IC4: constraint4, mov4
Suppose that the merge choices are:
IC5=IC1 & IC2: mov5=Max(mov1, mov2)
IC6=IC3 & IC4: mov6=Max(mov3, mov4)

In some cases, the merger may be selected that has the lower of mov5 and mov6. In some cases, the merger may be selected that minimizes the difference between (i) mov5 and min(mov1, mov2), and (ii) mov6 and min(mov3, mov4). Thus, e.g., if mov1=100 and mov2=101, then mov5=101 and the difference between min(mov1, mov2) is 1. If mov3=90 and mov4=120, then mov6=120 and the difference between mov6 and min(mov3, mov4) is 30. The merger that minimizes this difference (i.e., IC5) will be chosen.

Request-Response Processing

In preferred implementations, invalidation of an actual resource takes place at the time of a request for that resource. This is advantageous for a number of reasons, including that there is essentially nothing to be done (other than store the invalidation information) if the resource is never requested.

When the service gets a request for a resource (e.g., an HTTP request), it checks the requested resource against the appropriate list of invalid resources (i.e., against the list of invalid resources for that property). If the resource corresponds to a constraint on the list and the ROV value of the resource is less than the MOV value of the constraint, then a valid/fresh version of the resource must be obtained before the resource can be served. Accordingly, if a constraint on the list indicates that a requested resource is invalid, the service replicates the resource (e.g., from a content provider's content source such as an origin server or from another location (e.g., a peer) in the CDN). The ROV value of the resource is updated when a new version of the resource is obtained.

For example, suppose that a user requests the resource "/XYZ/PQR/fa.gif" prior to the crumple described above. In this example, suppose that the cache has a version of "/XYZ/PQR/fa.gif" with an rov=101. The requested resource matches the invalidation constraint "/XYZ/PQR/f*", but the ROV of the cached resource (rov=101) is greater than the MOV value (mov=100) associated with the constraint. The cached version can be served. After the crumpling described above, the MOV value of the constraint "/XYZ/PQR/f*" is 110, and so the cached resource "/XYZ/PQR/fa.gif", with an rov=101, is considered invalid. The server refreshes the resource "/XYZ/PQR/fa.gif", e.g., from an origin server or another location in the CDN. The refreshed version must have an ROV of at least 110 in order to be considered valid. As explained above, the version may have already been valid and may have been implicated as invalid (as a false positive) because of the crumpling.

Exemplary operation of invalidation in a CDN is described in U.S. Pat. No. 8,060,613, the entire contents of which are fully incorporated herein by reference for all purposes.

It should be appreciated that the crumpling need not occur on the same device as served as the content. For example, the crumpling may be done at an edge device or could be done centrally.

Computing

The services, mechanisms, operations and acts shown and described above are implemented, at least in part, by software running on one or more computers of CDN 100.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 7:
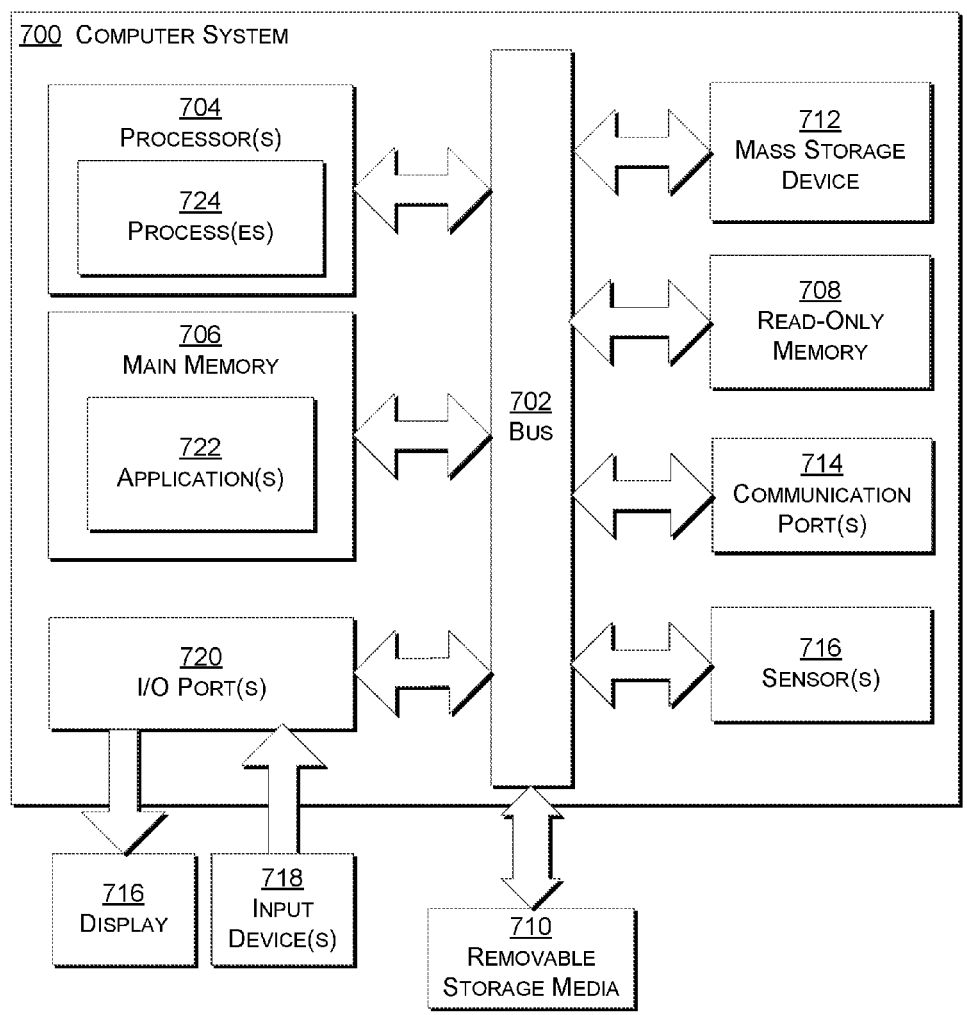
FIG. 7 depicts aspects of computing according to exemplary embodiments hereof.

FIG. 7 is a schematic diagram of a computer system 700 upon which embodiments of the present disclosure may be implemented and carried out.

According to the present example, the computer system 700 includes a bus 702 (i.e., interconnect), one or more processors 704, a main memory 706, removable storage media 710, read-only memory 708, mass storage 712, and one or more communications ports 714. Communication port 714 may be connected to one or more networks by way of which the computer system 700 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 704 can be any known processor, such as, but not limited to, an Intel® Itanium® or Itanium 2® processor(s), AMD® Opteron® or Athlon MP® processor(s), or Motorola® lines of processors, and the like. Communications port(s) 714 can be any of an RS-232 port for use with a modem based dial-up connection, a 10/100 Ethernet port, a Gigabit port using copper or fiber, or a USB port, and the like. Communications port(s) 714 may be chosen depending on a network such as a Local Area Network (LAN), a Wide Area Network (WAN), a CDN, or any network to which the computer system 700 connects. The computer system 700 may be in communication with peripheral devices (e.g., display screen 716, input device(s) 718) via Input/Output (I/O) port 720.

Main memory 706 can be Random Access Memory (RAM), or any other dynamic storage device(s) commonly known in the art. Read-only memory 708 can be any static storage device(s) such as Programmable Read-Only Memory (PROM) chips for storing static information such as instructions for processor 704. Mass storage 712 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 702 communicatively couples processor(s) 704 with the other memory, storage, and communications blocks. Bus 702 can be a PCI/PCI-X, SCSI, a Universal Serial Bus (USB) based system bus (or other) depending on the storage devices used, and the like. Removable storage media 710 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 706 is encoded with application(s) 722 that supports the functionality as discussed herein (the application 722 may be an application that provides some or all of the functionality of the CD services described herein). Application(s) 722 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 704 accesses main memory 706 via the use of bus 702 in order to launch, run, execute, interpret or otherwise perform the logic instructions of the application(s) 722. Execution of application(s) 722 produces processing functionality of the service related to the application(s). In other words, the process(es) 724 represent one or more portions of the application(s) 722 performing within or upon the processor(s) 704 in the computer system 700.

It should be noted that, in addition to the process(es) 724 that carries (carry) out operations as discussed herein, other embodiments herein include the application 722 itself (i.e., the un-executed or non-performing logic instructions and/or data). The application 722 may be stored on a computer readable medium (e.g., a repository) such as a disk or in an optical medium. According to other embodiments, the application 722 can also be stored in a memory type system such as in firmware, read only memory (ROM), or, as in this example, as executable code within the main memory 706 (e.g., within Random Access Memory or RAM). For example, application 722 may also be stored in removable storage media 710, read-only memory 708 and/or mass storage device 712.

Those skilled in the art will understand that the computer system 700 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some services" means "one or more services", and includes the case of one service.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of CDN services" may include one or more CDN services.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram, the activities associated with those boxes may be performed in any order, including fully or partially in parallel.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

We claim:

1. A computer-implemented method, operable on a device in a content delivery network (CDN), wherein said CDN delivers content on behalf of at least one content provider, and wherein the content associated with said at least one content provider comprises at least one property, said device implementing a content delivery (CD) service, the method comprising, by said service on said device:
   (A) maintaining property invalidation information on said CD service, said property invalidation information comprising, for each property handled by said CD service, a list of one or more group invalidation commands;
   (B) in response to receipt by said CD service of at least one new group invalidation command for a particular property, attempting to add said new group invalidation command to said property invalidation information by:
      (B)(1) if a size of said list of one or more group invalidation commands for said particular property does not exceed a particular threshold, then inserting said new group invalidation command into said list; otherwise,
      (B)(2) if a size of said list of one or more group invalidation commands for said particular property exceeds a particular threshold, then (i) merging one or more invalidation commands to form a merged invalidation command, (ii) inserting said merged invalidation command into said list, and (iii) removing said one or more invalidation commands from said list, wherein said merging is based on a length of common prefix of the invalidation commands being merged.

2. The method of claim 1 further comprising:
   (C) maintaining, on said CD service, a per property common prefix list for invalidation commands in each property list, and wherein said merging uses said common prefix list to determine which invalidation commands to merge.

3. The method of claim 2 wherein said per property common prefix list is sorted from smallest impact to largest impact, based on one or more impact assumptions.

4. The method of claim 2 wherein, when a new invalidation pattern is received, the new pattern is checked against the existing list of patterns and if a common prefix is found, then the common prefix is selectively added to said common prefix list.

5. The method of claim 1 wherein group invalidation commands comprise constraint patterns.

6. The method of claim 5 wherein the constraint patterns comprise glob patterns.

7. The method of claim 1 further comprising:
   (D) in response to a request received at said CD service for a particular resource, if a copy of said particular resource is in a cache of said CD service, then:
      (D)(1) determining, using said property invalidation information on said CD service, whether said particular resource is valid, and
      (D)(2) based on said determining in (D)(1), when it is determined that said particular resource is not valid, obtaining a valid version of said particular resource and basing a response to said request on said valid version of said particular resource.

8. The method of claim 1 wherein said list of one or more group invalidation commands comprises a data structure that maintains the prefix list in a sorted order.

9. The method of claim 8 wherein the data structure that maintains the prefix list sorted from smallest impact to largest impact.

10. The method of claim 1 wherein each invalidation command in said list of one or more group invalidation commands comprises a constraint and a minimum origin version (MOV) value, and wherein said list of one or more group invalidation commands is a MOV-ordered list.

11. The method of claim 10 wherein said merging of one of more invalidation commands in (B)(2)(i), comprises determining an MOV value for the merged invalidation command based on MOV values of the one of more invalidation commands being merged.

12. The method of claim 11 wherein the MOV value for the merged invalidation command is set to a maximum of the MOV values of the one of more invalidation commands being merged.

13. The method of claim 10 wherein the constraint of the merged invalidation command was already in the list prior the merging.

14. The method of claim 13 wherein the constraint of the merged invalidation command was a constraint of one of the one of more invalidation commands being merged in (B)(2)(i).

15. An article of manufacture comprising a non-transitory computer-readable medium having program instructions stored thereon, the program instructions, operable on a computer system in a content delivery network (CDN), wherein said CDN delivers content on behalf of at least one content provider, and wherein the content associated with said at least one content provider comprises at least one property, said device implementing a content delivery (CD) service, wherein execution of the program instructions by one or more processors of said computer system causes the one or more processors to carry out the acts of:
   (A) maintaining property invalidation information on said CD service, said property invalidation information comprising, for each property handled by said CD service, a list of one or more group invalidation commands;
   (B) in response to receipt by said CD service of at least one new group invalidation command for a particular property, attempting to add said new group invalidation command to said property invalidation information by:
      (B)(1) if a size of said list of one or more group invalidation commands for said particular property does not exceed a particular threshold, then inserting said new group invalidation command into said list; otherwise,
      (B)(2) if a size of said list of one or more group invalidation commands for said particular property exceeds a particular threshold, then (i) merging one or more invalidation commands to form a merged invalidation command, (ii) inserting said merged invalidation command into said list, and (iii) removing said one or more invalidation commands from said list, wherein said merging is based on a length of common prefix of the invalidation commands being merged.

16. A device in a content delivery network (CDN), wherein said CDN delivers content on behalf of at least one content provider, and wherein the content associated with said at least one content provider comprises at least one property, said device implementing a content delivery (CD) service, the device:
  (A) maintaining property invalidation information on said CD service, said property invalidation information comprising, for each property handled by said CD service, a list of one or more group invalidation commands;
  (B) in response to receipt by said CD service of at least one new group invalidation command for a particular property, attempting to add said new group invalidation command to said property invalidation information by:
    (B)(1) if a size of said list of one or more group invalidation commands for said particular property does not exceed a particular threshold, then inserting said new group invalidation command into said list; otherwise,
    (B)(2) if a size of said list of one or more group invalidation commands for said particular property exceeds a particular threshold, then (i) merging one or more invalidation commands to form a merged invalidation command, (ii) inserting said merged invalidation command into said list, and (iii) removing said one or more invalidation commands from said list, wherein said merging is based on a length of common prefix of the invalidation commands being merged.

* * * * *